US008843135B2

(12) United States Patent
Shaheen

(10) Patent No.: US 8,843,135 B2
(45) Date of Patent: Sep. 23, 2014

(54) METHOD AND APPARATUS FOR HANDOVER AND SESSION CONTINUITY USING PRE-REGISTRATION TUNNELING PROCEDURE

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 197 days.

(21) Appl. No.: 13/524,647

(22) Filed: Jun. 15, 2012

(65) Prior Publication Data

US 2013/0150041 A1 Jun. 13, 2013

Related U.S. Application Data

(63) Continuation of application No. 12/169,751, filed on Jul. 9, 2008, now Pat. No. 8,238,311.

(60) Provisional application No. 60/948,587, filed on Jul. 9, 2007, provisional application No. 60/949,085, filed on Jul. 11, 2007.

(51) Int. Cl.
*H04W 36/14* (2009.01)
*H04W 36/00* (2009.01)
*H04W 80/10* (2009.01)

(52) U.S. Cl.
CPC .......... *H04W 36/14* (2013.01); *H04W 36/0016* (2013.01); *H04W 80/10* (2013.01)
USPC ....................................................... 455/436

(58) Field of Classification Search
None
See application file for complete search history.

(56) References Cited

U.S. PATENT DOCUMENTS

| 2006/0002355 | A1  | 1/2006 | Baek et al. |
| 2006/0056448 | A1* | 3/2006 | Zaki et al. ..................... 370/466 |
| 2006/0146803 | A1* | 7/2006 | Bae et al. ..................... 370/352 |
| 2007/0047491 | A1  | 3/2007 | Dutta et al. |
| 2008/0102815 | A1* | 5/2008 | Sengupta et al. ............ 455/424 |

OTHER PUBLICATIONS

3rd Generation Partnership Project (3GPP), TS 23.402 V1.1.0, "Technical Specification Group Services and System Aspects, Architecture Enhancements for Non-3GPP Accesses (Release 8)", Jun. 2007, 1-50.

(Continued)

*Primary Examiner* — Chi Pham
*Assistant Examiner* — Kouroush Mohebbi
(74) *Attorney, Agent, or Firm* — Condo Roccia Koptiw LLP

(57) ABSTRACT

A method and apparatus for session continuity using pre-registration tunneling procedure are disclosed. For session continuity, a tunnel is established between a multi-mode wireless transmit/receive unit (WTRU) and a core network of a target system via a source system while the WTRU is still connected with the source system. An access procedure is performed toward the target system using the tunnel. A handover is the performed from the source system to the target system once the access procedure is complete. The access procedure includes session initiation protocol (SIP) registration, authentication of the WTRU at the target system, and internet protocol (IP) configuration. The handover may be from a third generation partnership project (3GPP) system to a non-3GPP system, or vice versa.

20 Claims, 14 Drawing Sheets

(56) References Cited

OTHER PUBLICATIONS

3rd Generation Partnership Project (3GPP), TS 23.402 V8.0.0, "Technical Specification Group Services and System Aspects, Architecture Enhancements for Non-3GPP Accesses (Release 8)", Dec. 2007, 1-131.

3rd Generation Partnership Project (3GPP), TS 23.402 V8.2.0, "Technical Specification Group Services and System Aspects, Architecture Enhancements for Non-3GPP Accesses (Release 8)", Jun. 2008, 1-181.

Choi et al., "Seamless Handoff Scheme Based on Pre-Registration and Pre-Authentication for UMTS—WLAN Interworking", Wireless Personal Communications, vol. 41, Issue 3, Aug. 23, 2006, 345-364.

* cited by examiner

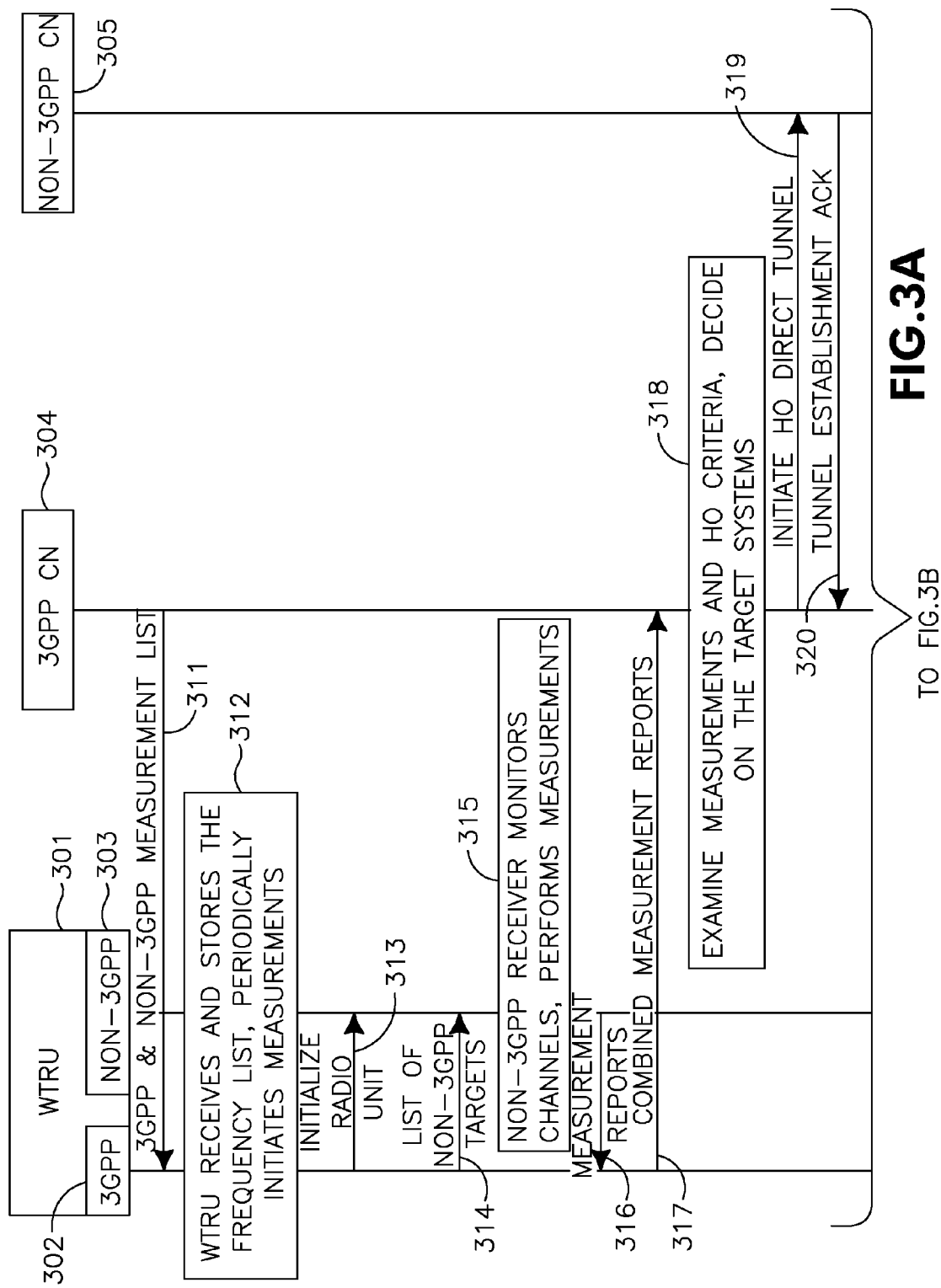

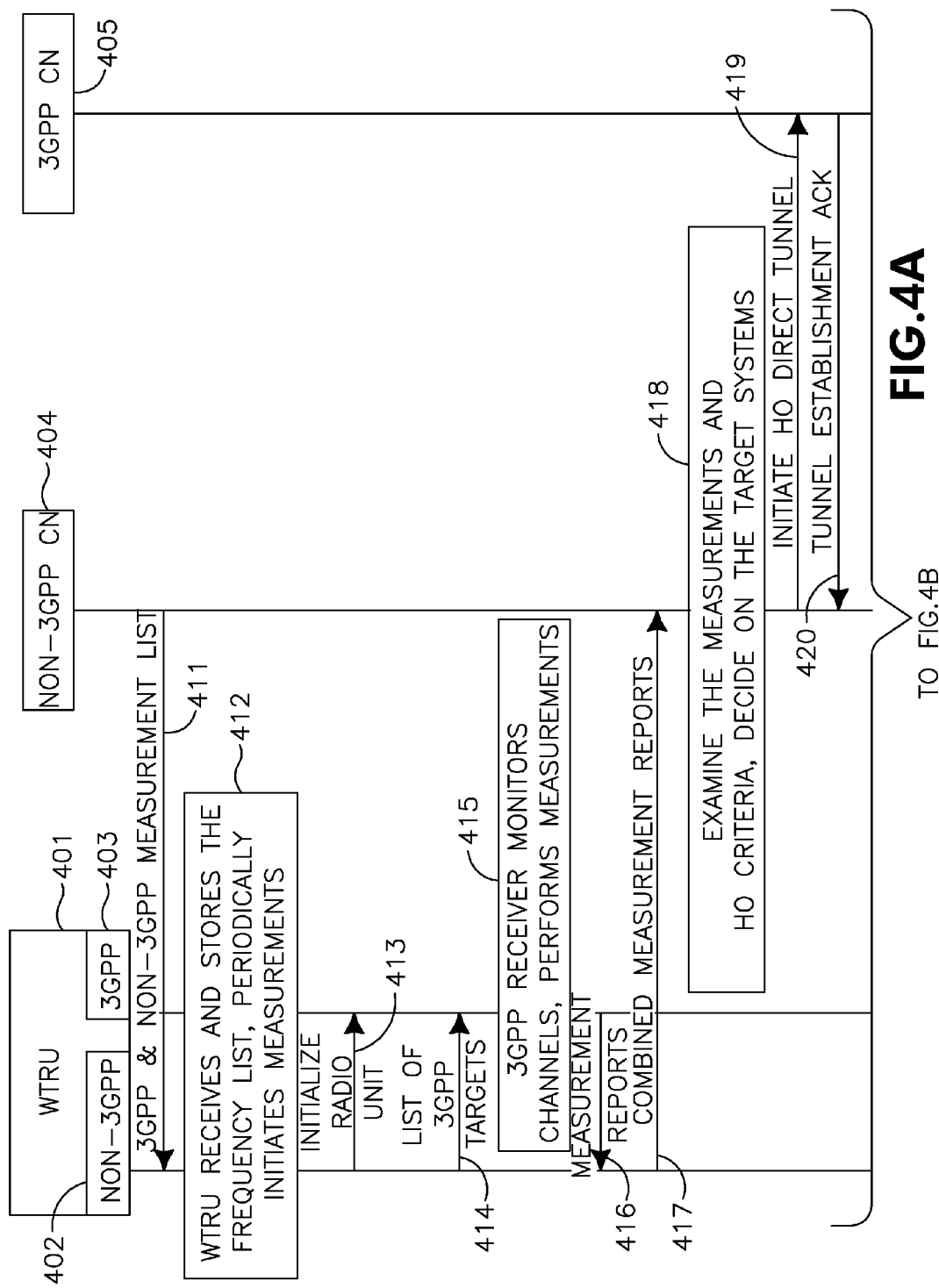

METHOD AND APPARATUS FOR HANDOVER AND SESSION CONTINUITY USING PRE-REGISTRATION TUNNELING PROCEDURE

CROSS REFERENCE TO RELATED APPLICATIONS

This application is a continuation of U.S. patent application Ser. No. 12/169,751, filed Jul. 9, 2008; which claims the benefit of U.S. Provisional Patent Application Nos. 60/948,587, filed Jul. 9, 2007, and 60/949,085, filed Jul. 11, 2007, the contents of which are hereby incorporated by reference herein in their entirety.

FIELD OF INVENTION

The present application is related to wireless communication systems.

BACKGROUND

A dual-mode or multi-mode wireless transmit/receive unit has dual or multiple radio transceivers, each designed to communicate on a particular radio access technology (RAT), such as 3rd Generation Partnership Project (3GPP) and non-3GPP systems. The handover process between 3GPP and non-3GPP systems may be slow due to the nature of the system configurations and operations. One problem occurs when a WTRU moves from one system to another as the WTRU is required to register and authenticate in the other system. A similar problem exists for session initiation protocol (SIP)-based Session Continuity processes between 3GPP and non-3GPP systems. When moving from one system to the other, the WTRU is required to register and authenticate in the other system before registering with internet protocol (IP) multimedia subsystem (IMS).

Another problem may occur due to the 3GPP prohibition against simultaneous radio transceiver operation. A single WTRU cannot have a 3GPP radio transceiver and a non-3GPP radio transceiver active at the same time. In such cases, dual-mode or multi-mode radio transceivers need sophisticated control of the radio switching.

SUMMARY

The present invention is related to a method and apparatus for session continuity using pre-registration tunneling procedure. For session continuity, a tunnel is established between a wireless transmit/receive unit (WTRU) and a core network of a target system via a source system while the WTRU is still connected with the source system. An access procedure is performed toward the target system using the tunnel. A handover is performed from the source system to the target system once the access procedure is complete. For session initiation protocol (SIP) based handover, the access procedure includes SIP registration, authentication of the WTRU at the target system, and internet protocol (IP) configuration. The handover may be from a third generation partnership project (3GPP) system to a non-3GPP system, or vice versa.

BRIEF DESCRIPTION OF THE DRAWINGS

A more detailed understanding of the invention may be had from the following description of a preferred embodiment, given by way of example and to be understood in conjunction with the accompanying drawings wherein:

FIGS. 3A and 3B show a signal diagram of a pre-registration procedure for a 3GPP to non-3GPP handover in accordance with the first embodiment;

FIGS. 4A and 4B show a signal diagram of a pre-registration procedure for a non-3GPP to 3GPP handover in accordance with the first embodiment;

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

By way of reference, as a WTRU moves from a system A to a system B, system A is defined as the handover source and system B is defined as the handover target. One mechanism to speed access procedures to a target system is to allow pre-registration and pre-authentication procedures to be performed by upper layers in a WTRU via the source system. The source system may identify the target system, establish a tunnel between the WTRU and the core target network, (e.g., Autonomous Registration (AR) or Access, Authentication and Accounting (AAA)), and instruct the WTRU to start access procedures for the target network. Upon successful completion of the access procedure, the source network may instruct the WTRU to switch, or handover, to the target network and turn off the radio connected to the source network.

Figure 1:
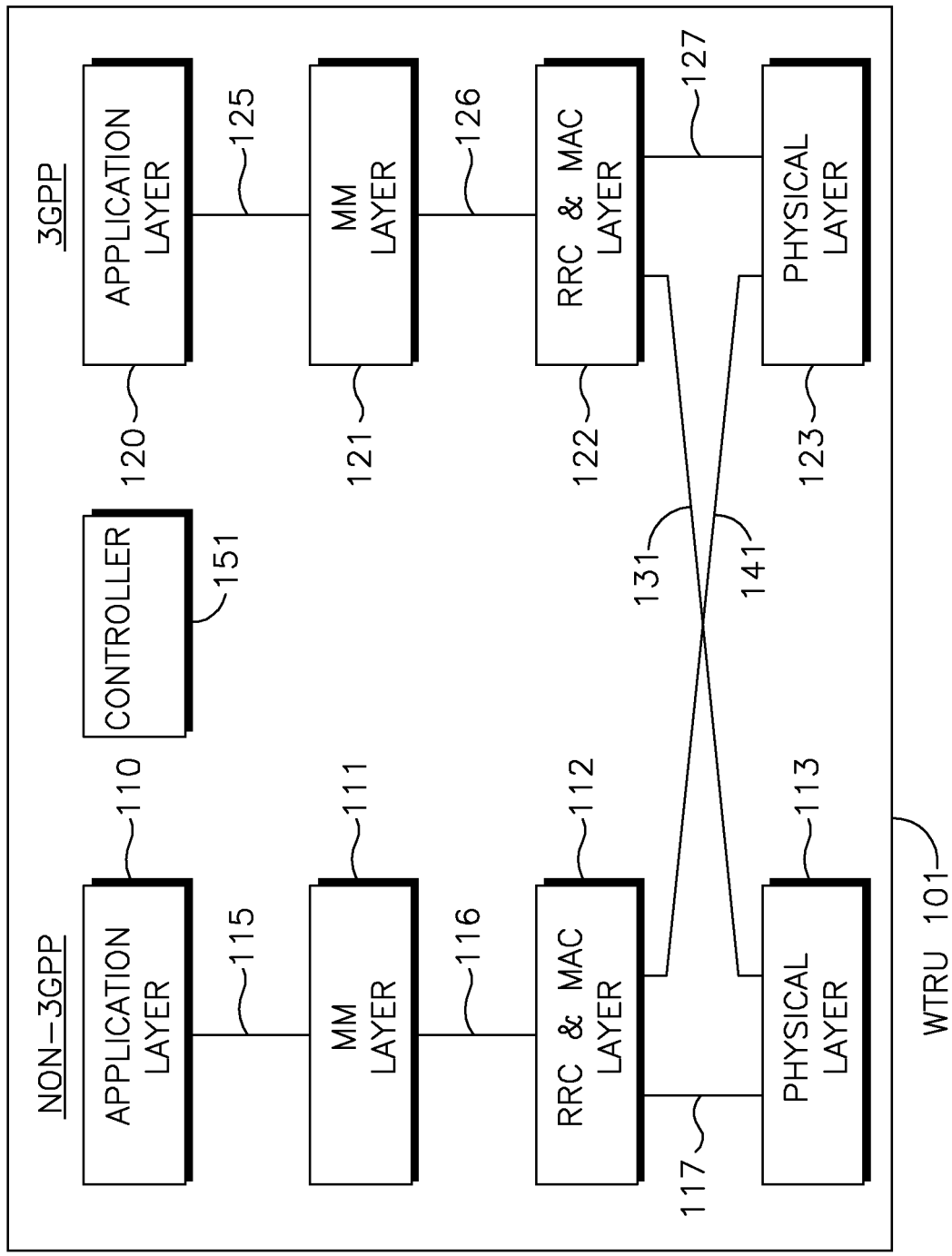
FIG. 1 shows a block diagram of dual protocol stack configuration in a dual mode wireless transmit/receive unit (WTRU) in accordance with a first embodiment.

FIG. 1 is a block diagram of dual protocol layer stack in a dual mode WTRU 101 supporting pre-registration tunneling in accordance with a first embodiment. As shown in FIG. 1, the WTRU 101 includes a non-3GPP protocol layer stack comprising an application layer 110, a mobility management (MM) layer 111, a radio resource control (RRC) and media access control (MAC) layer 112, and a physical (PHY) layer 113. The application layer 110 is coupled to the MM layer 111 by path 115. The MM layer 111 is coupled to the RRC/MAC layer 112 by path 116. Path 117 couples the RRC/MAC layer 112 to the PHY layer 113. Similarly, a 3GPP protocol layer stack comprises an application layer 120, a multimedia (MM) layer 121, a radio resource control (RRC) and media access control (MAC) layer 122, and a physical (PHY) layer 123.

The application layer 120 is coupled to the MM layer 121 by path 125. The MM layer 121 is coupled to the RRC/MAC layer 122 by path 126. Path 127 couples the RRC/MAC layer 122 to the PHY layer 123.

The dual protocol layer stack is further configured to include a path 141, which cross connects the non-3GPP PHY layer 113 to the 3GPP RRC/MAC layer 122. A path 131 couples the 3GPP PHY layer 123 to the non-3GPP RRC/MAC layer 112. These paths 131 and 141 are used to establish tunneling between 3GPP and non-3GPP systems to facilitate 3GPP to non-3GPP handover. A controller 151 controls the signaling for handover and access procedures executed at the protocol stack layers shown in FIG. 1.

Figure 2:
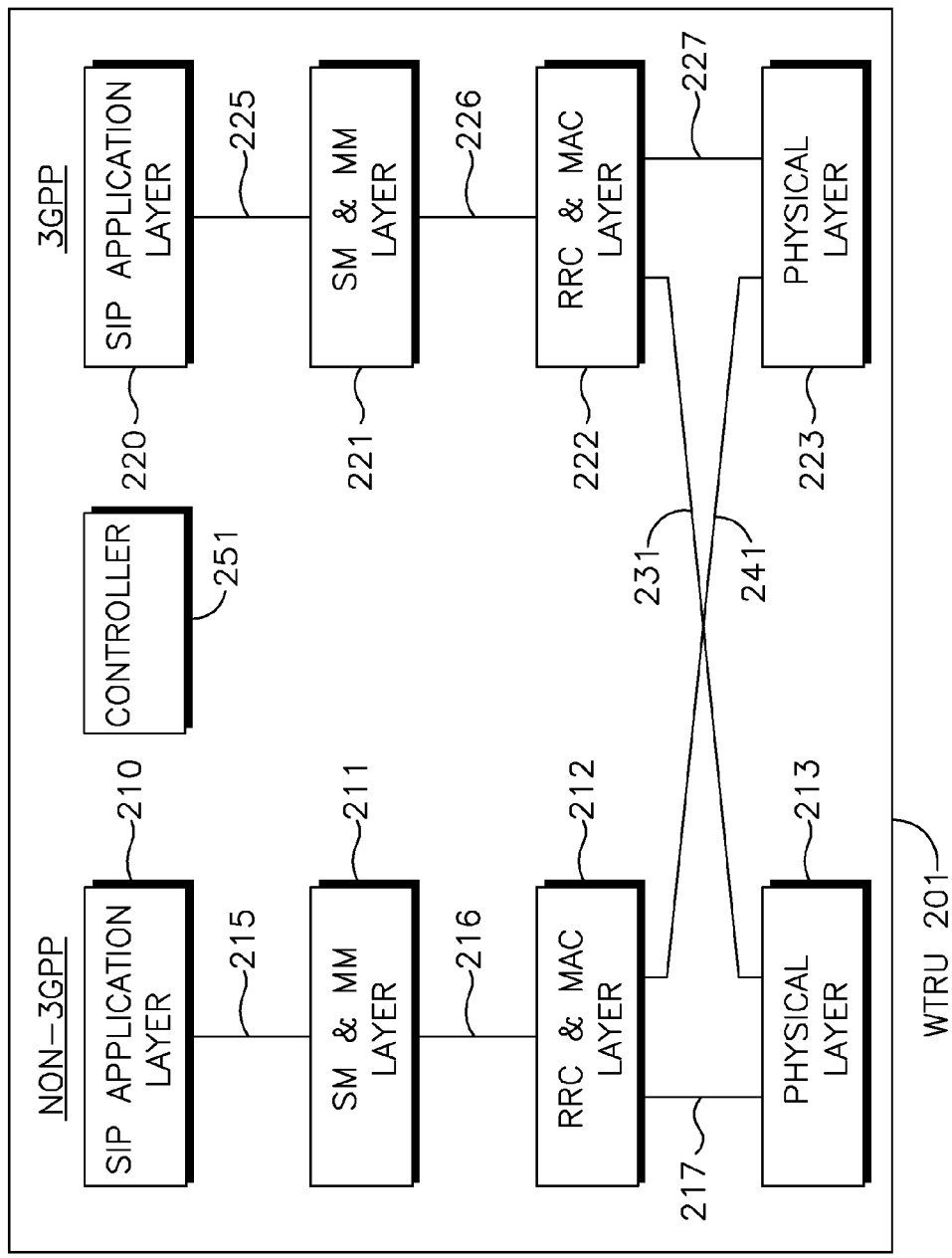
FIG. 2 shows a block diagram of a dual protocol stack configuration in a dual mode WTRU supporting pre-registration SIP-based session continuity in accordance with a second embodiment.

FIG. 2 is a block diagram of dual protocol layer stack in a dual mode WTRU 201 supporting pre-registration tunneling in accordance with a second embodiment. As shown in FIG. 2, the WTRU 201 includes a non-3GPP protocol layer stack comprising an application layer 210, a session management (SM) and mobility management (MM) layer 211, a radio resource control (RRC) and media access control (MAC) layer 212, and a physical (PHY) layer 213. The application layer 210 is coupled to the SM and MM layer 211 by path 215. The SM and MM layer 211 is coupled to the RRC/MAC layer 212 by path 216. Path 217 couples the RRC/MAC layer 212 to the PHY layer 213. Similarly, a 3GPP protocol layer stack comprises an application layer 220, a SM and MM layer 221, a radio resource control (RRC) and media access control (MAC) layer 222, and a physical (PHY) layer 223. The application layer 220 is coupled to the SM and MM layer 221 by path 225. The SM and MM layer 221 is coupled to the RRC/MAC layer 222 by path 226. Path 227 couples the RRC/MAC layer 222 to the PHY layer 223.

The dual protocol layer stack is further configured to include a path 241, which cross connects the non-3GPP PHY layer 213 to the 3GPP RRC/MAC layer 222. A path 231 couples the 3GPP PHY layer 223 to the non-3GPP RRC/MAC layer 212. These paths 231 and 241 are used to establish tunneling between 3GPP and non-3GPP systems to facilitate 3GPP to non-3GPP handover. A controller 251 controls the signaling for handover and access procedures executed at the protocol stack layers shown in FIG. 2.

Figure 3B:
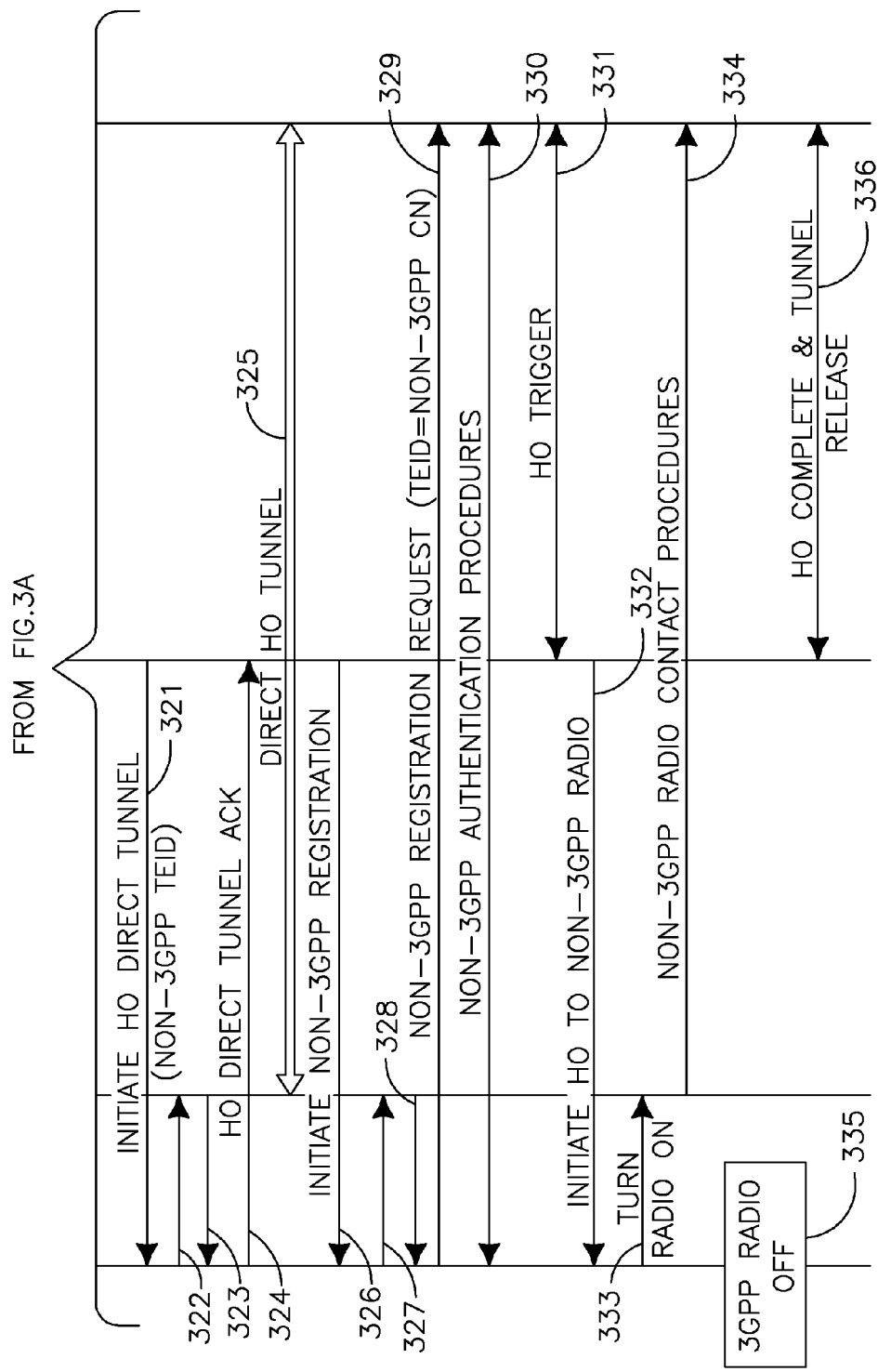

FIGS. 3A and 3B show a signal diagram for pre-registration procedure for a handover of a WTRU 301 from a 3GPP handover source 304 to a non-3GPP handover target 305. A WTRU 301 includes a 3GPP radio transceiver 302 and a non-3GPP radio transceiver 303 for communication with a 3GPP core network (CN) 304 and a non-3GPP CN 305. For simplicity, a dual mode WTRU 301 is shown, however the signaling described herein is valid for a multi-mode WTRU having multiple 3GPP and non-3GPP radio transceivers. While shown as direct signals from the WTRU 301 and CNs 303, 304, the signals may be relayed by a NodeB or a base station entity (not shown).

The pre-registration begins with the 3GPP transceiver 302 receiving a 3GPP and non-3GPP measurement list 311 from 3GPP CN 304. The measurement list 311 identifies the channel frequencies of candidate handover targets. At 312, the WTRU 301 stores the list in an internal memory, and for periodically initiating channel measurements. The 3GPP transceiver 302 sends an initialization signal 313 to the non-3GPP transceiver 303, along with a list of candidate non-3GPP handover targets 314. At 315, the non-3GPP transceiver 303 is activated for a period in order to perform measurement procedures, in which it monitors channels and performs measurements. The non-3GPP transceiver 303 sends measurement reports 316 of the monitored channels to the 3GPP transceiver 302. When measurement procedures by the non-3GPP transceiver 303 are completed, it may be deactivated.

At 317, the 3GPP transceiver 302 combines the measurements it made with those made by the non-3GPP transceiver 303, formulates combined measurement reports, and transmits the combined measurement reports to the 3GPP CN 304. At 318, the 3GPP CN 304 examines the combined measurement reports and handover (HO) criteria, and selects a handover target system for the WTRU 301. The 3GPP CN 304 sends a signal 319 to the target non-3GPP CN 305 to initiate a handover direct tunnel, and the target non-3GPP CN 305 responds with a tunnel establishment acknowledgment signal 320. The 3GPP CN 304 sends a signal 321 to the 3GPP transceiver 302 to initiate a handover direct tunnel. This signal 321 may include a non-3GPP tunnel endpoint identification (TEID). The 3GPP transceiver 302 sends the target ID 322 to the non-3GPP transceiver 303. The non-3GPP transceiver sends its handover direct tunnel acknowledgment (ACK) 323 to the 3GPP transceiver 302, which is then forwarded to the 3GPP CN 304 as signal 324. The direct handover tunnel 325 is established between the non-3GPP target CN 305 and the non-3GPP transceiver 303. The source 3GPP CN 304 sends a signal 326 to initiate a non-3GPP registration to the 3GPP transceiver 302 which is then forwarded as signal 327 to the non-3GPP transceiver 303. The upper layers of the non-3GPP transceiver 303 perform pre-registration pre-authentication procedures, and send a non-3GPP registration request 328, 329 via the 3GPP transceiver 302 to the non-3GPP target CN 305.

The 3GPP radio transceiver 302 and the non-3GPP target CN 305 then conduct authentication procedures 330. Handover triggers 331 are communicated directly between the 3GPP CN 304 and non-3GPP CN 305 and the 3GPP CN 304 initiates handover with a signal 332 to the 3GPP transceiver 302. The 3GPP transceiver 302 instructs the non-3GPP radio transceiver 303 to turn ON as signal 333. With the non-3GPP radio transceiver 303 turned ON, it makes initial contact with the non-3GPP CN 305 and commences radio contact procedures 334. The 3GPP radio transceiver 302 is turned OFF at 335 and the 3GPP CN 304 and non-3GPP CN 305 exchange handover complete and tunnel release signals 336.

Figure 4B:
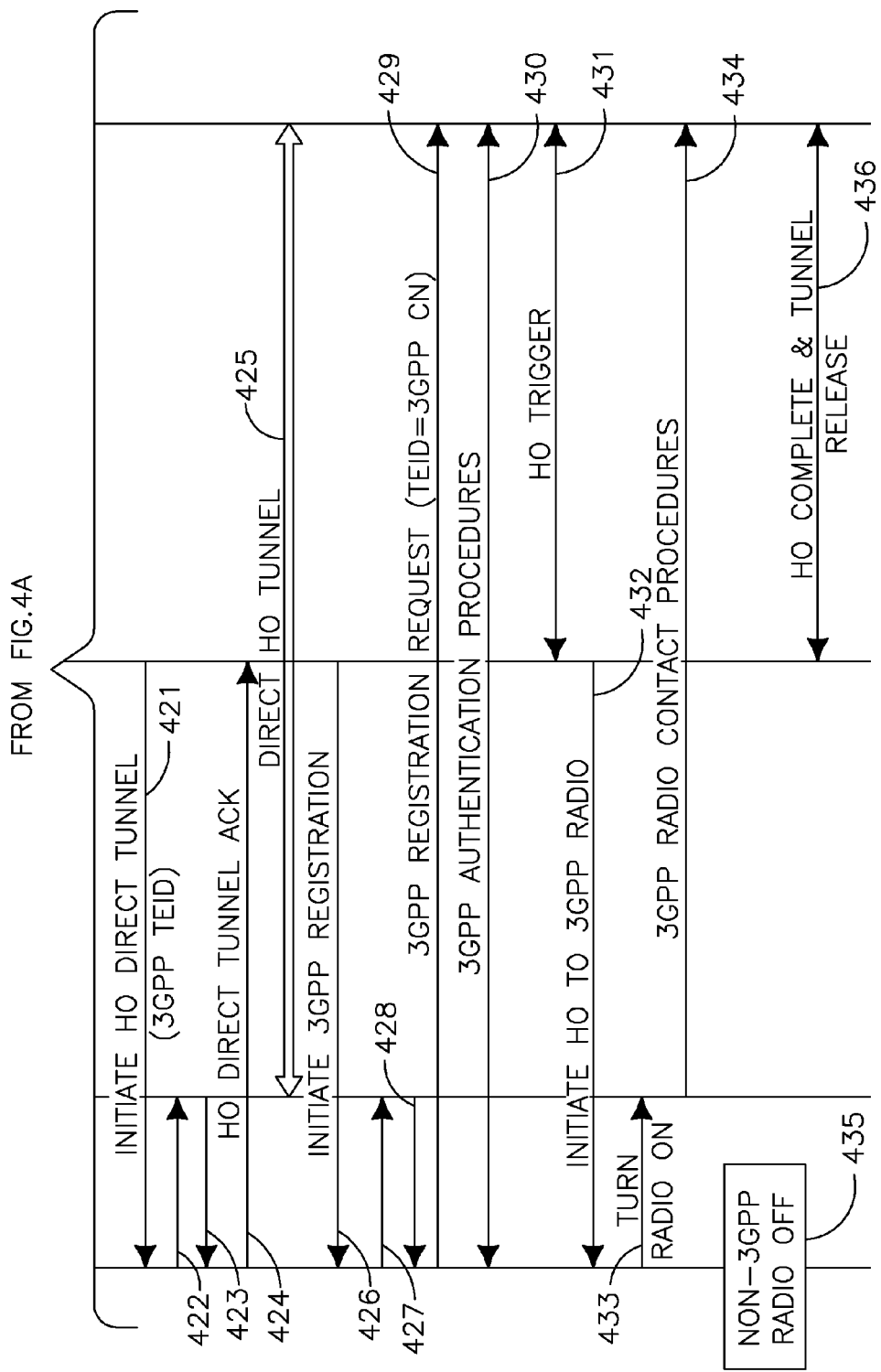

FIG. 4 is a signal diagram for pre-registration procedure for a handover of a WTRU 401 from a non-3GPP handover source 404 to a 3GPP handover target 405. A WTRU 401 includes a non-3GPP radio transceiver 402 and a 3GPP radio transceiver 403 for communication with a non-3GPP core network (CN) 404 and a 3GPP CN 405. For simplicity, a dual mode WTRU 401 is shown, however the signaling described herein is valid for a multi-mode WTRU having multiple 3GPP and non-3GPP radio transceivers. While shown as direct signals between the WTRU 401 and CNs 403, 404, the signals may be relayed by a NodeB or a base station entity (not shown). The pre-registration begins with the non-3GPP transceiver 402 receiving a 3GPP and non-3GPP measurement list 411 from non-3GPP CN 404. The measurement list 411 identifies the channel frequencies of candidate handover targets. At 412, the WTRU 401 stores the list in an internal memory, and for periodically initiating channel measurements. The non-3GPP transceiver 402 sends an initialization signal 413 to the 3GPP transceiver 403, along with a list of candidate 3GPP handover targets 414. The 3GPP transceiver 403 is activated and monitors channels and performs measurements at 415.

The 3GPP transceiver 403 sends measurement reports 416 of the monitored channels to the non-3GPP transceiver 402. The non-3GPP transceiver 402 combines the measurements it made with those made by the 3GPP transceiver 403, formulates combined measurement reports, and transmits the combined measurement reports 417 to the non-3GPP CN 404. At 418, the non-3GPP CN 404 examines the combined measurement reports and selects a handover target system for the WTRU 401. The non-3GPP CN 404 sends a signal 419 to the target 3GPP CN 405 to initiate a handover direct tunnel, and the target 3GPP CN 405 responds with a tunnel establishment acknowledgment signal 420. The 3GPP non-CN 404 sends a signal 421 to the non-3GPP transceiver 402 to initiate a handover direct tunnel. This signal 421 may include a 3GPP tunnel endpoint identification (TEID). The non-3GPP transceiver 402 sends the target ID 422 to the 3GPP transceiver 403. The 3GPP transceiver sends its handover direct tunnel acknowledgment (ACK) 423 to the non-3GPP transceiver 402, which is then forwarded to the non-3GPP CN 404 as signal 424. The direct handover tunnel 425 is established between the 3GPP target CN 405 and the 3GPP transceiver 403. The source non-3GPP CN 404 sends a signal 426 to initiate a 3GPP registration to the non-3GPP transceiver 402 which is then forwarded as signal 427 to the 3GPP transceiver 403. A 3GPP registration request 428,429 is sent from the 3GPP transceiver 403 via the non-3GPP transceiver 402 to the 3GPP target CN 405.

The non-3GPP radio transceiver 402 and the 3GPP target CN 405 then conduct authentication procedures 430. Handover triggers 431 are communicated directly between the non-3GPP CN 404 and 3GPP CN 405 and the non-3GPP CN 404 initiates handover with a signal 432 to the non-3GPP transceiver 402. The non-3GPP transceiver 402 instructs the non-3GPP radio transceiver 403 to turn ON with signal 433. With the 3GPP radio transceiver 403 turned ON, it makes initial contact with the 3GPP CN 405 and commences radio contact procedures 434. The non-3GPP radio transceiver 402 is turned OFF at 435 and the non-3GPP CN 404 and 3GPP CN 405 exchange handover complete and tunnel release signals 436.

Figure 5A:
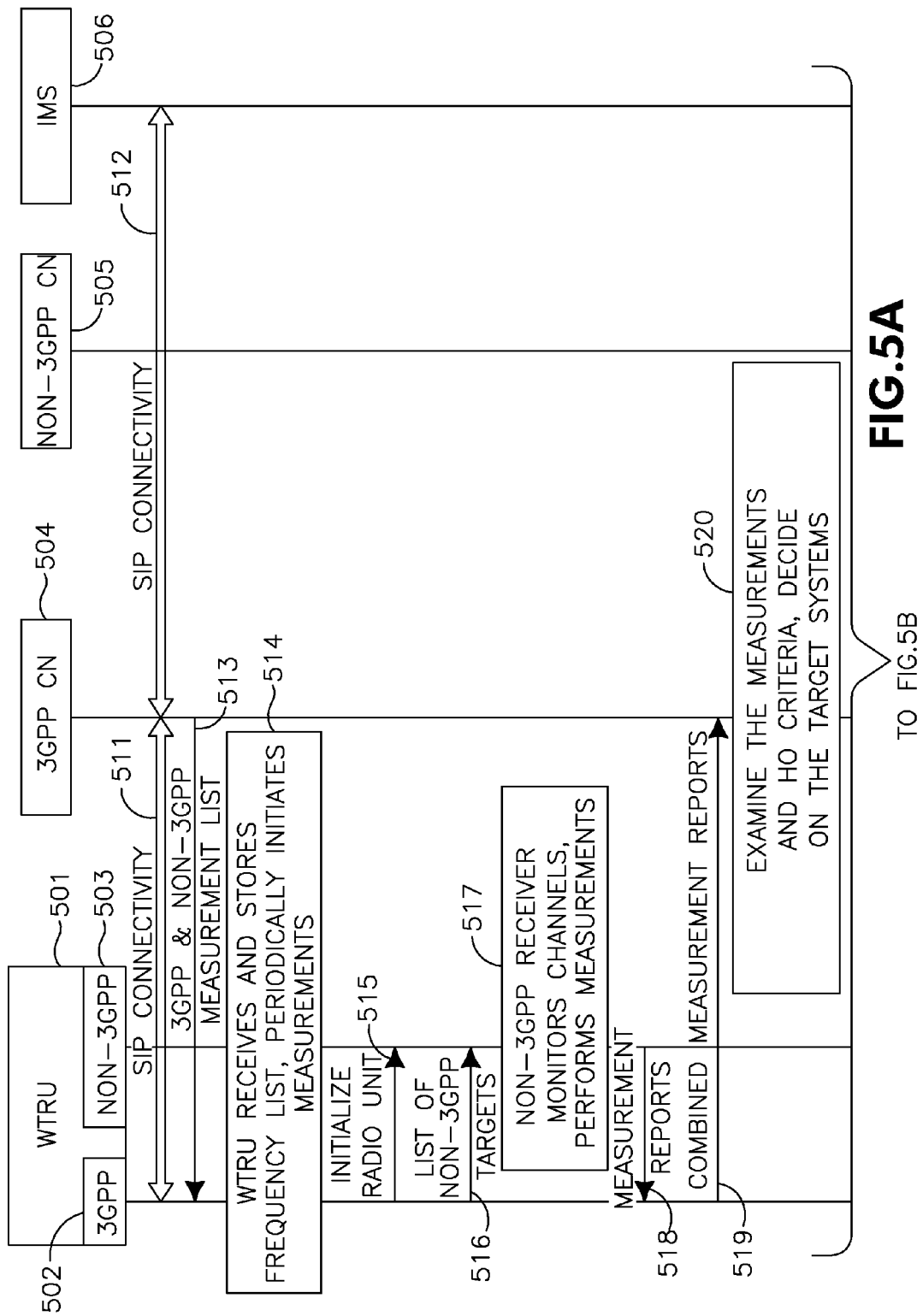
FIGS. 5A, 5B and 5C show a signaling diagram of pre-registration procedures for 3GPP to non-3GPP handover in accordance with the second embodiment.
Figure 5B:
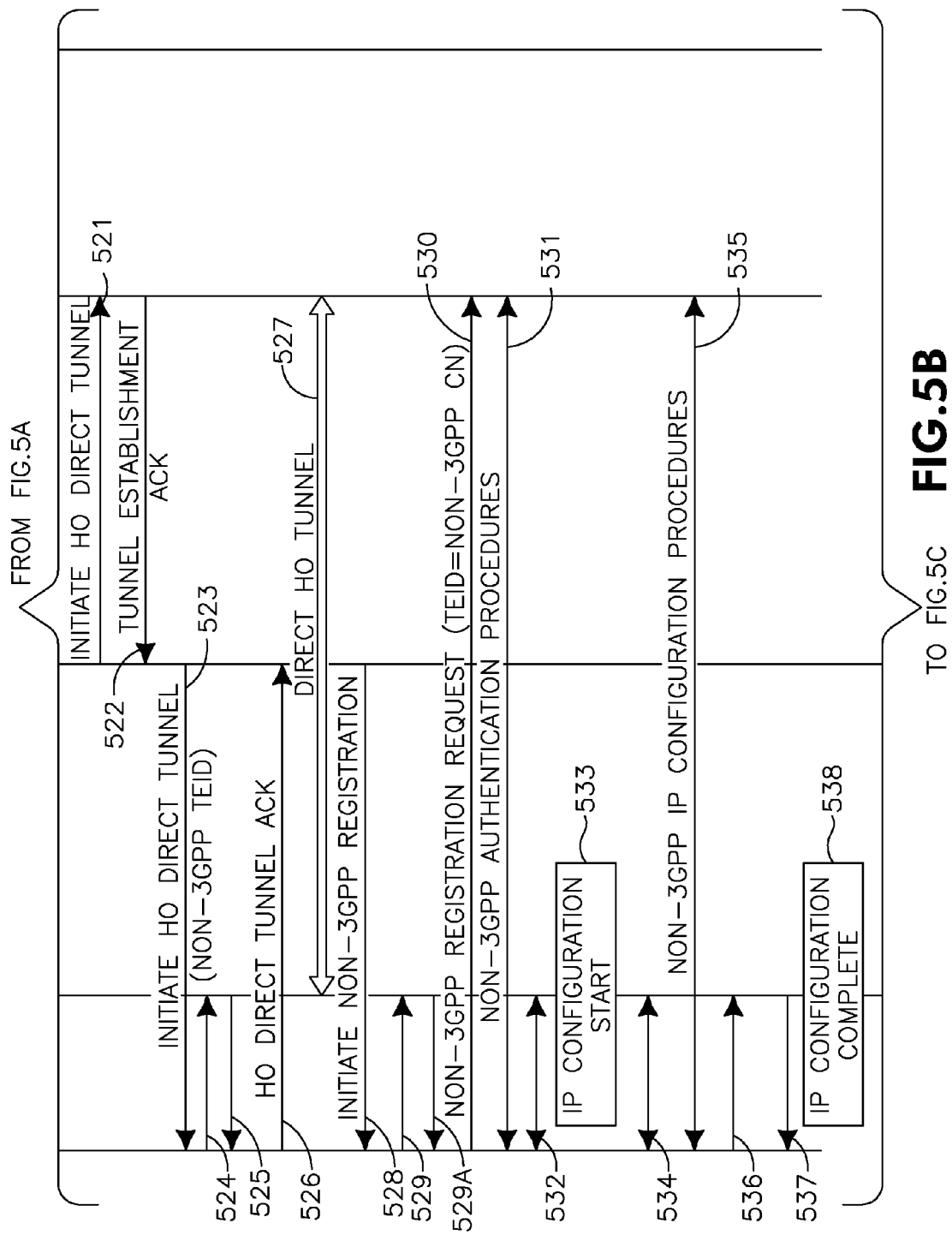
Figure 5C:
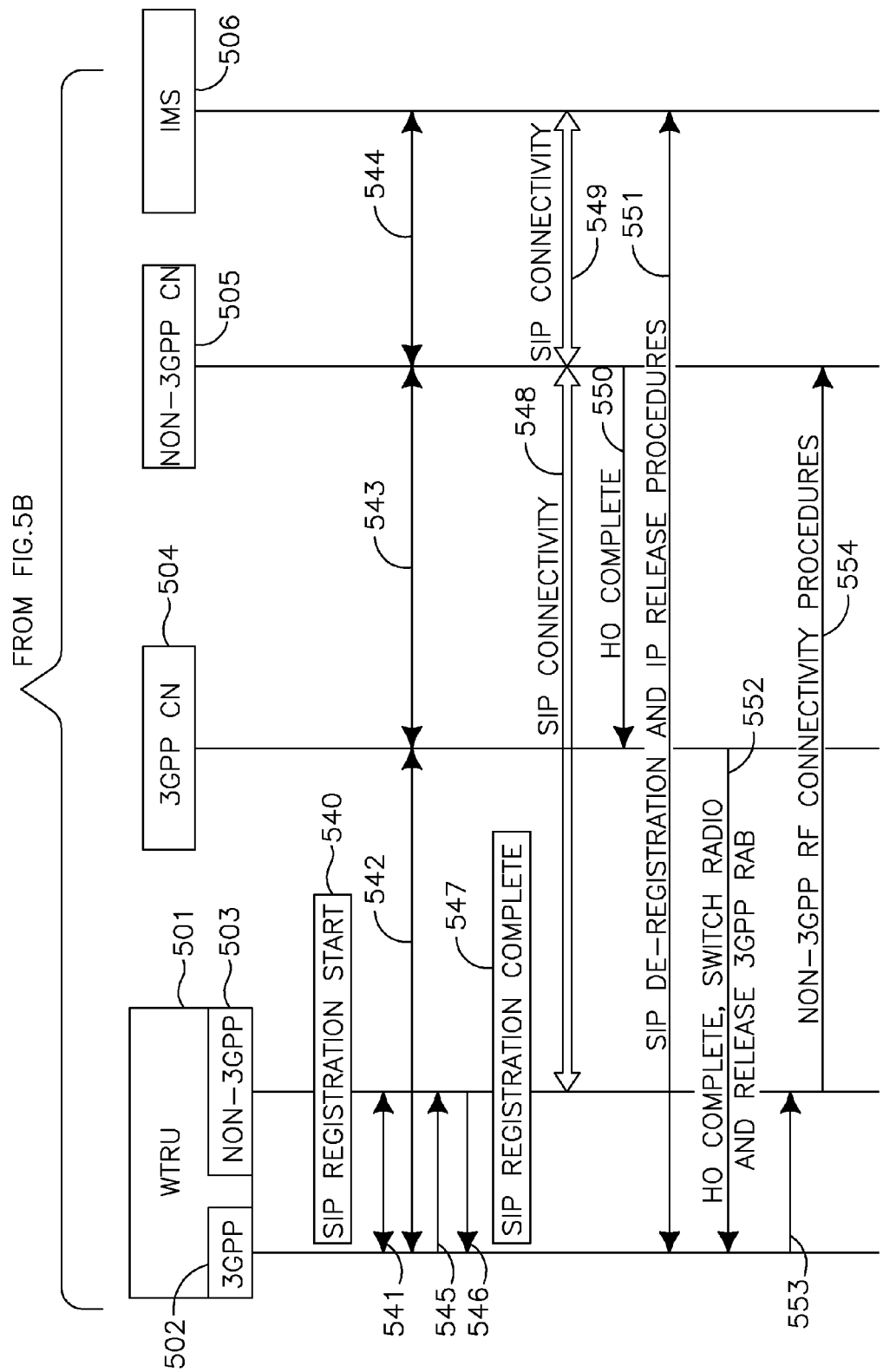

FIGS. 5A, 5B and 5C show a signaling diagram of an SIP-based handover of a dual-mode WTRU 501 from a 3GPP source system to a non-3GPP target system. In order to speed the access procedures and hence the handover to the target system, pre-registration and pre-authentication procedures are allowed to be performed by the upper layers in the WTRU 501 of the target technology via the source system, including the IP configuration and connectivity establishment, and the SIP registration and connectivity establishment.

In FIG. 5A, the WTRU 501 comprises a 3GPP radio transceiver 502 and a non-3GPP radio transceiver 503. Also shown are a 3GPP source CN 504 and a non-3GPP target CN 505. The core networks CN 504 and 505 may be implemented as an access router (AR), access service network (ASN), or authentication, authorization and accounting (AAA) entity. The non-3GPP target system may include for example 3GPP2, WiMAX, or WiFi.

As shown in FIG. 5A, SIP connectivity 511 is already established between the 3GPP transceiver 502 and the 3GPP CN 504 and SIP connectivity 512 is already established between the 3GPP CN 504 and the internet protocol (IP) multimedia server (IMS) 506. The pre-registration begins with the 3GPP transceiver 502 receiving a 3GPP and non-3GPP measurement list 513 from 3GPP CN 504. The measurement list 513 identifies the channel frequencies of candidate handover targets. At 514, the WTRU 501 stores the list in an internal memory, and for use in periodically initiating channel measurements. The 3GPP transceiver 502 sends an initialization signal 515 to the non-3GPP transceiver 503, along with a list of candidate non-3GPP handover targets 516. At 517, the non-3GPP transceiver 503 monitors channels and performs measurements.

The non-3GPP transceiver 503 sends measurement reports 518 of the monitored channels to the 3GPP transceiver 502. The 3GPP transceiver 502 combines the measurements it made with those made by the non-3GPP transceiver 503, formulates combined measurement reports, and transmits the combined measurement reports 519 to the 3GPP CN 504. At 520, the 3GPP CN 504 examines the combined measurement reports and selects a handover target system for the WTRU 501. The 3GPP CN 504 sends a signal 521 (FIG. 5B) to the target non-3GPP CN 505 to initiate a handover direct tunnel, and the target non-3GPP CN 505 responds with a tunnel establishment acknowledgment signal 522. The 3GPP CN 504 sends a signal 523 to the 3GPP transceiver 502 to initiate a handover direct tunnel. This signal 523 may include a non-3GPP tunnel endpoint identification (TEID). The 3GPP transceiver 502 sends the target ID 524 to the non-3GPP transceiver 503. The non-3GPP transceiver sends its handover direct tunnel acknowledgment (ACK) 525 to the 3GPP transceiver 502, which is then forwarded to the 3GPP CN 504 as signal 526. The direct handover tunnel 527 is established between the non-3GPP target CN 505 and the non-3GPP transceiver 503. The source 3GPP CN 504 sends a signal 528 to initiate a non-3GPP registration to the 3GPP transceiver 502 which is then forwarded as signal 529 to the non-3GPP transceiver 503. A non-3GPP registration request 529A is sent from the non-3GPP transceiver 503 to the 3GPP transceiver 502, and forwarded as signal 530 to the non-3GPP target CN 505. The registration request 529A, 530 may include the TEID of the target CN 505.

The 3GPP radio transceiver 502 and the non-3GPP target CN 505 then conduct authentication procedures 531. Signaling 532 occurs between different protocol stack layers of the 3GPP radio transceiver 502 and the non-3GPP transceiver 503, where authorization information is exchanged to update the status of the protocol. If successful, then the process of establishing IP connection commences at 533. The signaling 534 between the WTRU radio transceivers 502, 503 for establishing IP connectivity is started by tunneling the non-3GPP IP configuration message to the 3GPP protocol stack along crossover path 241.

The 3GPP transceiver 502 establishes non-3GPP IP configuration procedures 535 with the non-3GPP CN 505. IP configuration messages 536, 537 are exchanged between the 3GPP transceiver 502 and the non-3GPP transceiver 503, which may include the IP address of the IP gateway, IP type (e.g., IPv4 or IPv6) and the corresponding quality of signal (QoS) parameters. Additional information may also be sent in the signals 536, 537, including a list of Proxy Call State Control Function (P-CSCF) to support the non-3GPP radio transceiver 503 to configure its SIP connectivity. The IP configuration of the non-3GPP transceiver is complete at 538.

For a handover between a 3GPP system and a non-3GPP system, two different IP gateways are involved. One IP gateway is for 3GPP, which is connecting the IMS to the 3GPP transceiver 502, and the other IP gateway is for establishing the IP connectivity over a non-3GPP system for the non-3GPP transceiver 503.

As shown in FIG. 5C, the SIP based handover signaling continues at 540, where the non-3GPP transceiver 503 commences SIP registration procedures. Signals 541-544 are used to exchange SIP addresses and to perform P-CSCF discovery for connecting the SIP layer in the non-3GPP transceiver 503 to the IMS 506 via the Non-3GPP Core network. Signal 541 is exchanged between the 3GPP transceiver 502 and the non- 3GPP transceiver 503 using the crossover path 241. Signal 542 is sent over the 3GPP air interface from the 3GPP transceiver 602 PHY layer. Signal 543 is exchanged between the 3GPP CN 504 and the non-3GPP CN 505 and signal 544 is exchanged between the non-3GPP CN 505 and the IMS 506. Acknowledgment signals 545 and 546 are sent between the appropriate protocol layer in the Non-3GPP transceiver 503 and the 3GPP transceiver 502 upon successful SIP registration.

With the SIP registration of the non-3GPP transceiver 503 complete at 547, SIP connectivity 548 and 549 is established between the non-3GPP transceiver 503 and the non-3GPP CN 505, and between the non-3GPP CN 505 and the IMS 506, respectively. The non-3GPP CN 505 informs the 3GPP CN 504 that handover is complete with signal 550. The 3GPP transceiver 502 then performs SIP deregistration and IP release procedures 551 with the IMS 506. The 3GPP transceiver 502 receives signal 552 from the 3GPP CN 504 indicating a handover complete, a radio switch OFF command and a release 3GPP radio access bearer (RAB) command. The 3GPP transceiver 502 informs the non-3GPP transceiver 503 that the handover is complete with signal 553, and the non-3GPP radio transceiver 503 is activated ON. At 554, the non-3GPP transceiver 503 commences non-3GPP RF connectivity procedures with the non-3GPP CN 505.

Figure 6A:
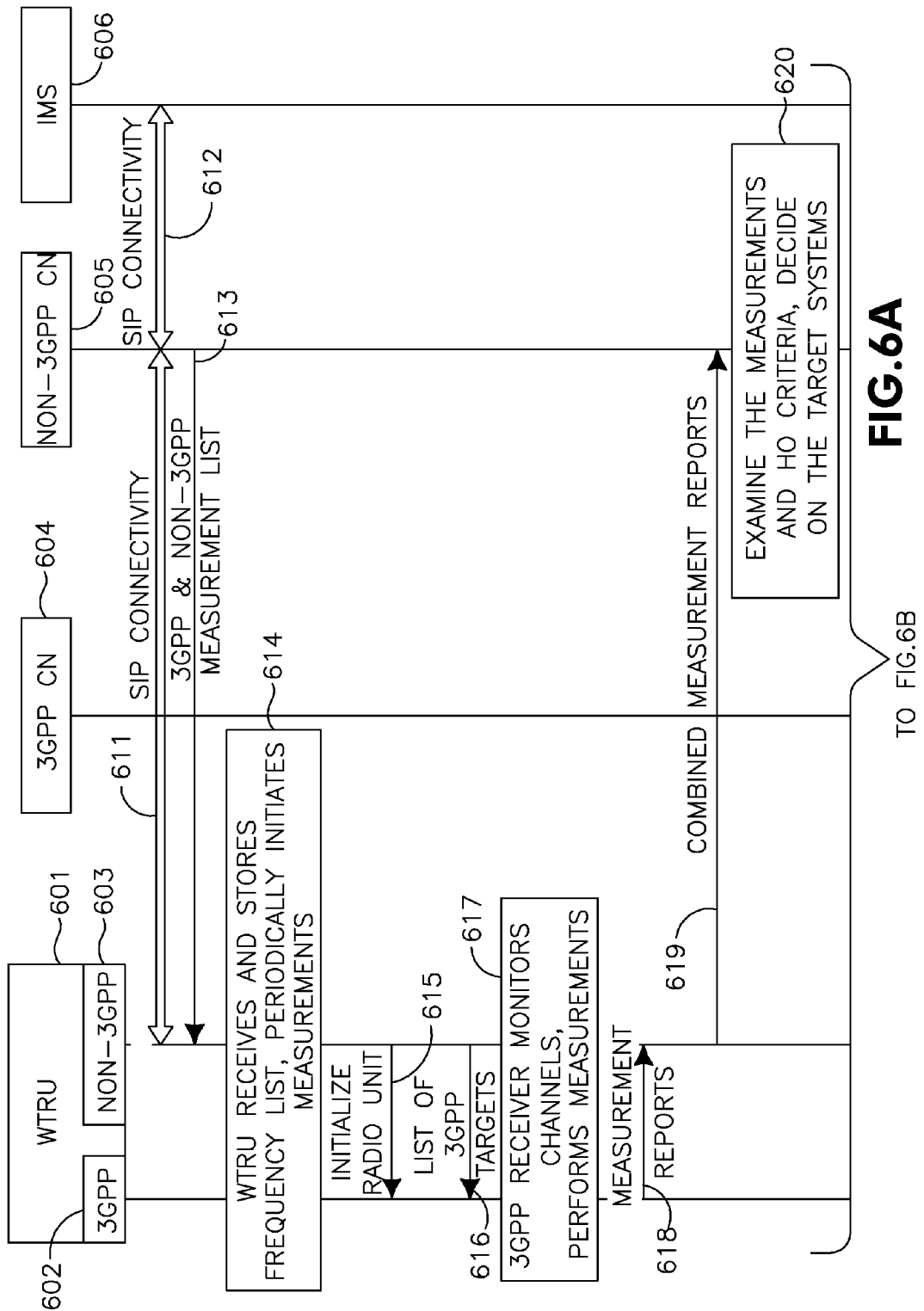
FIGS. 6A, 6B and 6C show a signaling diagram of pre-registration procedures for non-3GPP to 3GPP handover in accordance with the second embodiment.
Figure 6B:
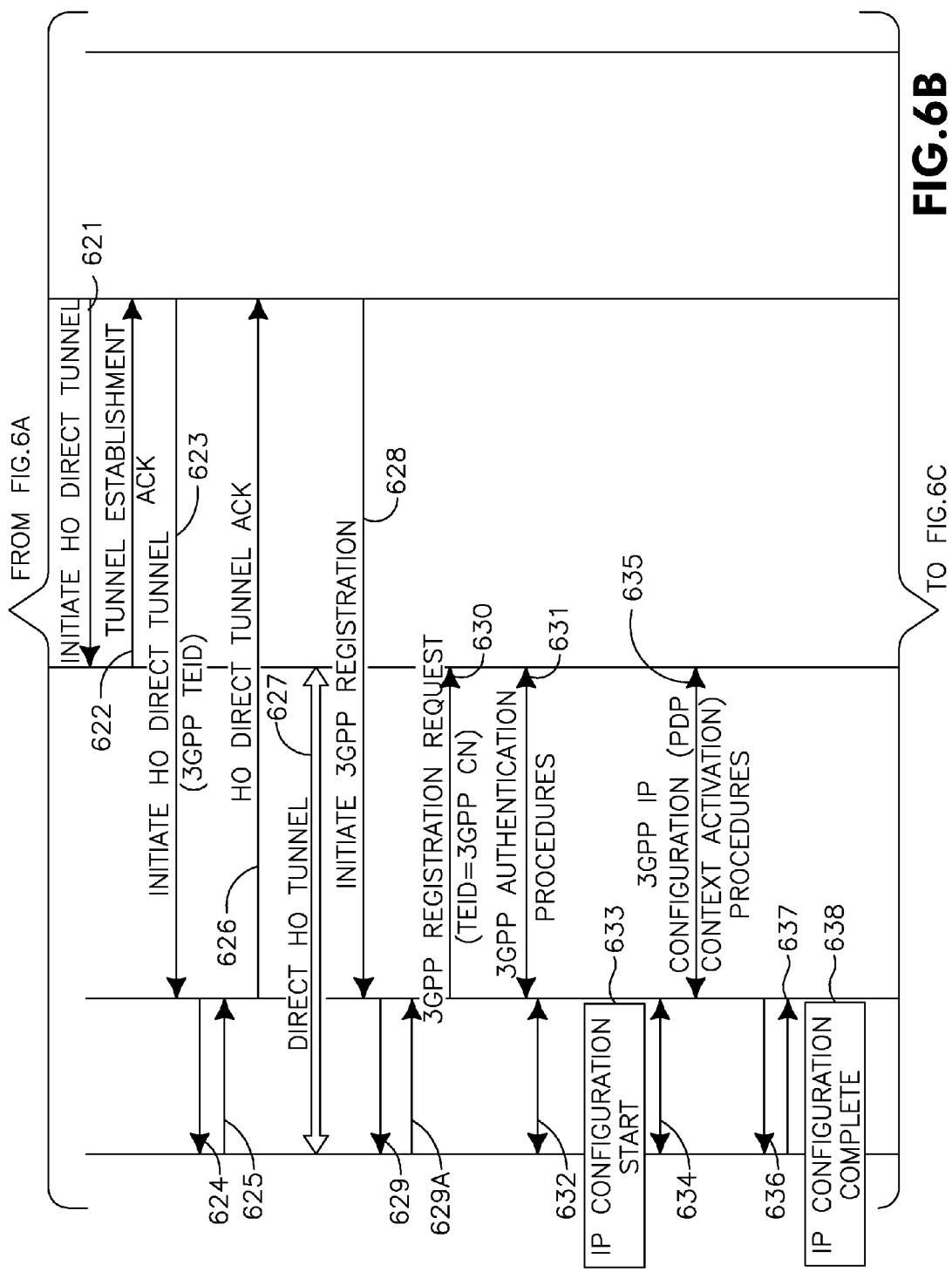
Figure 6C:
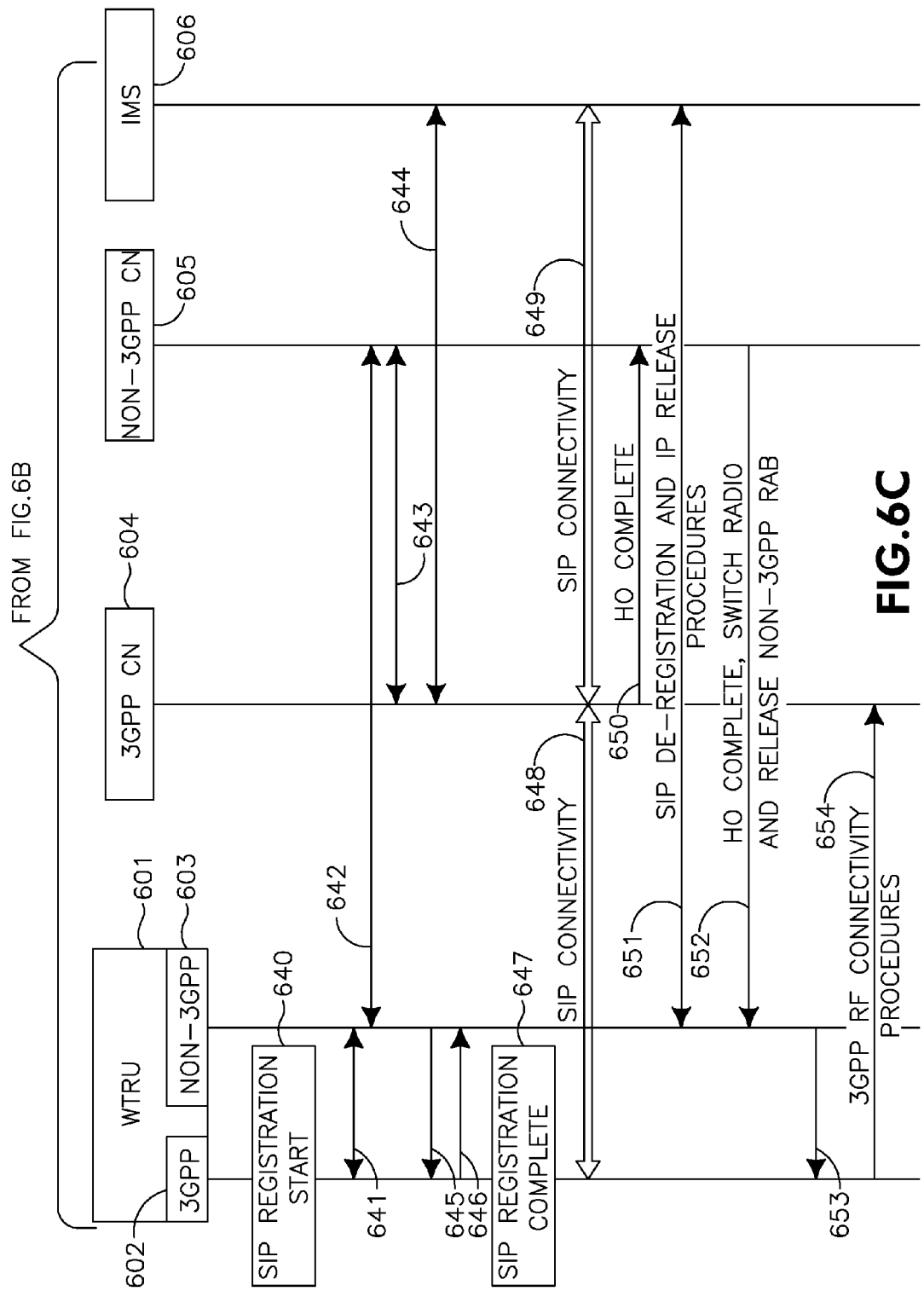

FIGS. 6A, 6B and 6C show a signaling diagram of an SIP-based handover of a dual-mode WTRU 601 from a non-3GPP source system to a 3GPP target system. In order to speed the access procedures and hence the handover to the target system, pre-registration and pre-authentication procedures are allowed to be performed by the upper layers in the WTRU 601 of the target technology via the source system, including the IP configuration and the SIP registration procedures.

In FIG. 6A, the WTRU 601 comprises a 3GPP radio transceiver 602 and a non-3GPP radio transceiver 603. Also shown are a 3GPP target CN 604 and a non-3GPP source CN 605. The core networks CN 604 and 605 may be implemented as an access router (AR), access service network (ASN), or authentication, authorization and accounting (AAA) entity. The non-3GPP target system may include for example 3GPP2, WiMAX, or WiFi.

As shown in FIG. 6A, SIP connectivity 611 is already established between the non-3GPP transceiver 603 and the non-3GPP CN 605 and SIP connectivity 612 is already established between the non-3GPP CN 604 and the IP multimedia server (IMS) 606. The pre-registration begins with the 3GPP transceiver 603 receiving a 3GPP and non-3GPP measurement list 613 from non-3GPP CN 605. The measurement list 613 identifies the channel frequencies of candidate handover targets. At 614, the WTRU 601 stores the list in an internal memory, and for use in periodically initiating channel measurements. The non-3GPP transceiver 603 sends an initialization signal 615 to the 3GPP transceiver 602, along with a list of candidate 3GPP handover targets 616. At 617, the 3GPP transceiver 602 monitors channels and performs measurements.

The 3GPP transceiver 602 sends measurement reports 618 of the monitored channels to the non-3GPP transceiver 603. The non-3GPP transceiver 603 combines the measurements it made with those made by the 3GPP transceiver 603, formulates combined measurement reports, and transmits the combined measurement reports 619 to the non-3GPP CN 605. At 620, the non-3GPP CN 605 examines the combined measurement reports and selects a handover target system for the WTRU 601. The non-3GPP CN 605 sends a signal 621 (FIG. 6B) to the target 3GPP CN 604 to initiate a handover direct tunnel, and the target 3GPP CN 604 responds with a tunnel establishment acknowledgment signal 622. The non-3GPP CN 605 sends a signal 623 to the non-3GPP transceiver 603 to initiate a handover direct tunnel This signal 623 may include a 3GPP tunnel endpoint identification (TEID). The non-3GPP transceiver 603 sends the target ID 624 to the 3GPP transceiver 602. The 3GPP transceiver 602 sends its handover direct tunnel acknowledgment (ACK) 625 to the non-3GPP transceiver 603, which is then forwarded to the non-3GPP CN 605 as signal 626. The direct handover tunnel 627 is established between the 3GPP target CN 604 and the 3GPP transceiver 602. The source non-3GPP CN 605 sends a signal 628 to initiate a 3GPP registration to the non-3GPP transceiver 603 which is then forwarded as signal 629 to the 3GPP transceiver 602. A 3GPP registration request 629A is sent from the 3GPP transceiver 602 to the non-3GPP transceiver 603 and forwarded as signal 630 to the 3GPP target CN 604. The registration request 629A, 630 may include the TEID of the target CN 604.

The non-3GPP radio transceiver 603 and the 3GPP target CN 604 then conduct authentication procedures 631. Signaling 632 occurs between different protocol stack layers of the 3GPP radio transceiver 602 and the non-3GPP transceiver 603, where authorization information is exchanged to update the status of the protocol. If successful, then the process of establishing IP connection commences at 633. The signaling 634 for IP connectivity is started by tunneling the 3GPP IP configuration message to the non-3GPP protocol stack along crossover path 231.

The non-3GPP transceiver 603 establishes 3GPP IP configuration procedures 635 with the 3GPP CN 604. IP configuration messages 636, 637 are exchanged between the 3GPP transceiver 602 and the non-3GPP transceiver 603, which may include the IP address of the IP gateway, IP type (e.g., IPv4 or IPv6) and the corresponding quality of signal (QoS) parameters. Additional information may also be sent in the signals 636, 637, including a list of Proxy Call State Control Function (P-CSCF) to support the 3GPP radio transceiver 602 to configure its SIP connectivity. The IP configuration of the non-3GPP transceiver is complete at 638.

As shown in FIG. 6C, the SIP based handover signaling continues at 640, where the 3GPP transceiver 602 commences SIP registration procedures. Signals 641-644 are used to exchange SIP addresses and to perform P-CSCF discovery for connecting the SIP layer in the 3GPP transceiver 602 to the IMS 606 via the 3GPP core network 604. Signal 641 is exchanged between the 3GPP transceiver 602 upper layers and the non-3GPP transceiver 603 PHY layer using the crossover path 231. Signal 642 is sent over the non-3GPP air interface from the non-3GPP transceiver 603 PHY layer to the non-3GPP CN 605. Signal 643 is exchanged between the non-3GPP CN 605 and the 3GPP CN 604 and signal 644 is exchanged between the 3GPP CN 604 and the IMS 606. Acknowledgment signals 645 and 646 are sent between the appropriate protocol layer in the Non-3GPP transceiver 603 and the 3GPP transceiver 602 upon successful SIP registration.

With the SIP registration of the 3GPP transceiver 602 complete at 647, SIP connectivity 648 and 649 is established between the 3GPP transceiver 602 and the 3GPP CN 604, and between the 3GPP CN 604 and the IMS 606, respectively. The 3GPP CN 604 informs the non-3GPP CN 605 that handover is complete with signal 650. The non-3GPP transceiver 603 then performs SIP deregistration and IP release procedures 651 with the IMS 606. The non-3GPP transceiver 603 receives signal 652 from the non-3GPP CN 605 indicating a handover complete, a radio switch OFF command and a release non-3GPP radio access bearer (RAB) command. The non-3GPP transceiver 603 informs the 3GPP transceiver 602 that the handover is complete with signal 653, and the 3GPP radio transceiver 602 is activated ON. At 654, the 3GPP transceiver 602 commences 3GPP RF connectivity procedures with the 3GPP CN 604.

Figure 7:
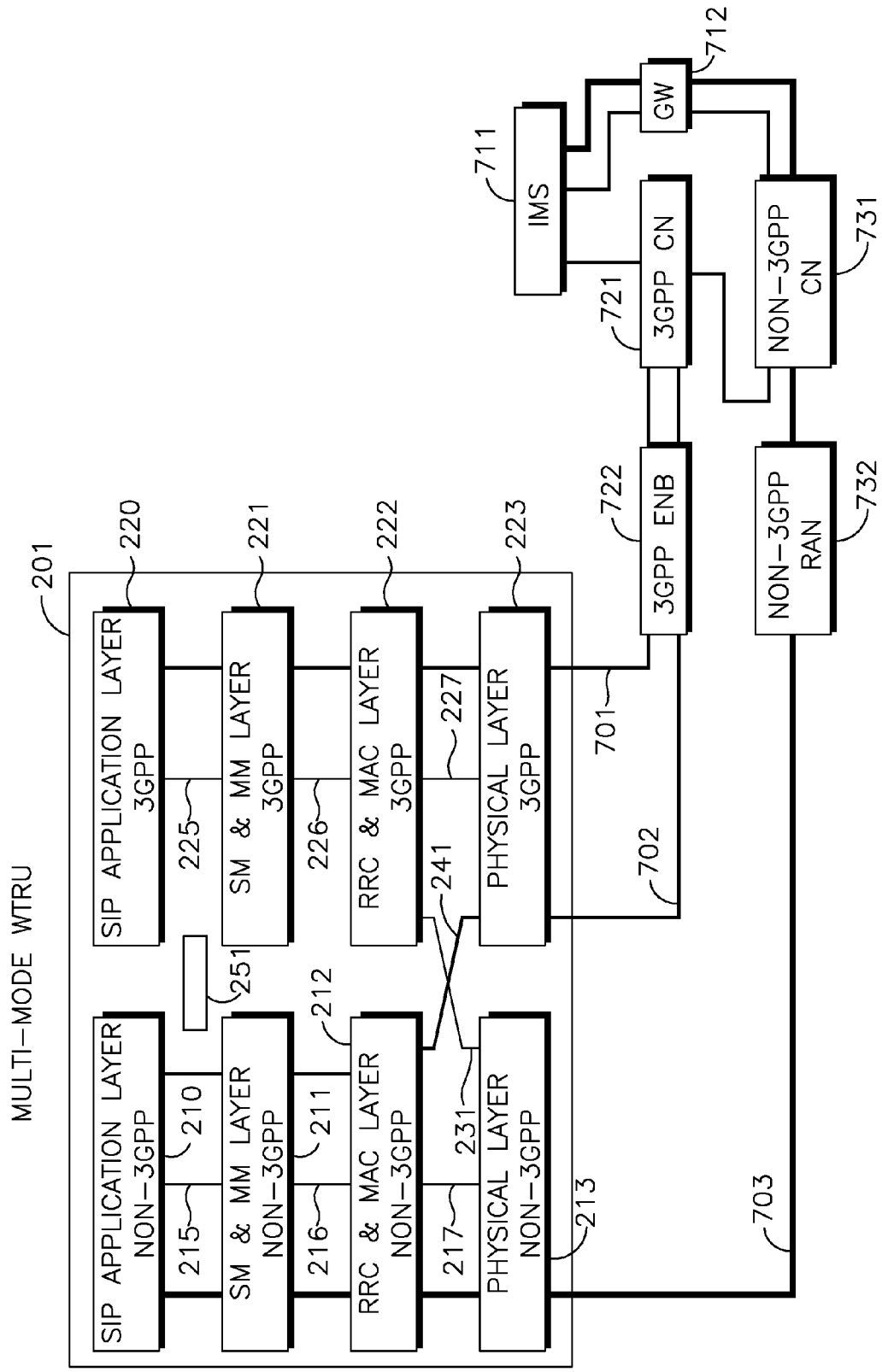
FIG. 7 shows dual stack operation in a multi-mode WTRU supporting pre-registration SIP-based session continuity for 3GPP to non-3GPP handover in accordance with the second embodiment.
Figure 8:
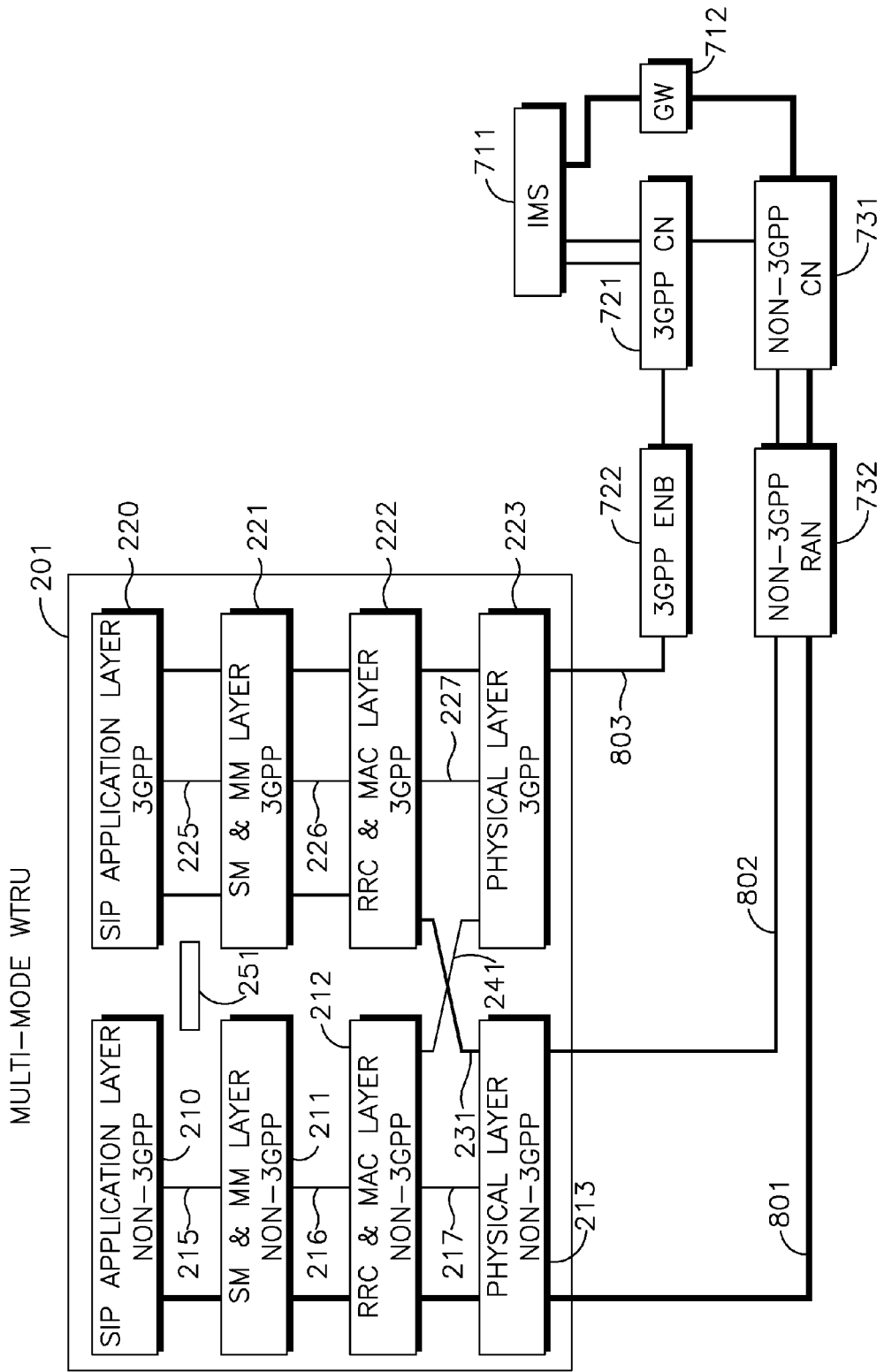
FIG. 8 shows dual stack operation in a multi-mode WTRU supporting pre-registration SIP-based session continuity for non-3GPP to 3GPP handover in accordance with the second embodiment.

FIGS. 7 and 8 show systematic block diagrams for the SIP based handover method described above. In FIG. 7, communication links for a handover of WTRU 201 from a 3GPP source system to a non-3GPP target system is shown sequentially by signal paths 701, 702 and 703. Initially, the WTRU 201 is connected to the 3GPP source system on signal path 701 via an IMS 711, a 3GPP CN 721, and a 3GPP eNodeB (eNB) 722 that is in a wireless communication with the 3GPP PHY layer 223. In order to prepare for handover to a non-3GPP target, a make-before-break path 702 is established to the non-3GPP transceiver protocol stack (i.e., SIP application layer 210, SM and MM layer 211, RRC and MAC layer 212) via the crossover path 241 between the 3GPP PHY layer 223 and non-3GPP RRC and MAC layer 212. The communication path 702 allows the non-3GPP protocol stack to receive target system information via the active 3GPP source system using the 3GPP eNB 722, the 3GPP CN 721, which exchanges information with the target non-3GPP CN 731, gateway (GW) 712 and IMS 711. The communication path 702 is established when the WTRU 201 receives instructions from the source 3GPP system to start the access procedures toward the target system and to perform the sequence of access specific procedures (e.g., Attach, IP configuration, and SIP Registration). Upon successful completion of the access specific procedures and the SIP registration, the SIP connectivity is established as shown by communication path 703 between the non-3GPP protocol stack (i.e. layers 210, 211, 212 and PHY layer 213) and the non-3GPP radio access network (RAN) 732, the non-3GPP CN 731, the gateway (GW) 712 and IMS 711. The WTRU 201 receives instructions from the 3GPP source system to switch (or handover) to the non-3GPP target system and turn off the radio on the 3GPP source system (i.e., turn OFF the 3GPP transceiver of WTRU 201), which terminates the communication links 701 and 702. This ensures that the SIP based session is established to the non-3GPP target system. A WTRU controller 251 executes the access procedures and the handover procedures responsive to the received instructions from the 3GPP source system.

In FIG. 8, communication links for a handover of WTRU 201 from a non-3GPP source system to a 3GPP target system is shown sequentially by signal paths 801, 802 and 803. Initially, the WTRU 201 is connected to the non-3GPP source system on signal path 801 via an IMS 711, a gateway (GW) 712, a non-3GPP CN 731, and a non-3GPP RAN 732 that is in a wireless communication with the non-3GPP PHY layer 213. In order to prepare for handover to a 3GPP target system, a make-before-break path 802 is established between 3GPP target system to the 3GPP transceiver protocol stack (i.e., SIP application layer 220, SM and MM layer 221, RRC and MAC layer 222) via the crossover path 231 between the non-3GPP PHY layer 213 and non-3GPP RRC and MAC layer 222. The communication path 802 allows the 3GPP protocol stack to receive target system information via the active non-3GPP source system using the non-3GPP RAN 732, the non-3GPP CN 731, which exchanges information with the target 3GPP CN 721 and IMS 711. The communication path 802 is established when the WTRU 201 receives instructions from the source non-3GPP system to start the access procedures toward the 3GPP target system and to perform the sequence of access specific procedures (e.g., Attach, IP configuration, and SIP Registration). Upon successful completion of the access specific procedures and the SIP registration, the SIP connectivity is established as shown by communication path 803 between the 3GPP protocol stack (i.e. layers 220, 221, 222 and PHY layer 223) and the non-3GPP RAN 732, followed by the non-3GPP CN 731, the 3GPP CN 721 and IMS 711. The WTRU 201 receives instructions from the 3GPP source system to switch (or handover) to the non-3GPP target system and turn off the radio on the 3GPP source system (i.e., turn OFF the non-3GPP transceiver of WTRU 201), which terminates the communication links 801 and 802. This ensures that the SIP based session is established to the non-3GPP target system. A WTRU controller 251 executes the access procedures and the handover procedures responsive to the received instructions from the 3GPP source system.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:
1. A method for maintaining session continuity when a wireless transmit/receive unit (WTRU) switches from a source system to a target system, the method comprising:
receiving, at a physical (PHY) layer of a first radio transceiver associated with the source system, session information for establishing communication between the WTRU and the target system via a second radio transceiver associated with the target system;
transferring the session information directly from the PHY layer of the first radio transceiver associated with the source system to at least one of a radio resource control layer or a media access control layer of the second radio transceiver associated with the target system using a crossover connection between the first radio transceiver and the second radio transceiver; and using the session information to establish the communication between the WTRU and the target system via the second radio transceiver.

2. The method of claim 1, further comprising using the crossover connection between the first radio transceiver and the second radio transceiver to establish a tunnel between the WTRU and the target system.

3. The method of claim 1, further comprising receiving, at the WTRU, a message from the source system instructing the WTRU to initiate an access procedure toward the target system.

4. The method of claim 3, wherein the access procedure is a session initiation protocol (SIP) registration procedure resulting in SIP connectivity with the target system.

5. The method of claim 3, further comprising switching from the source system to the target system after the access procedure is complete.

6. The method of claim 3, wherein the access procedure includes packet data protocol (PDP) context activation.

7. The method of claim 3, wherein the access procedure includes establishing internet protocol (IP) connectivity to the target system.

8. The method of claim 3, wherein the access procedure is at least one of a pre-registration procedure or a pre-authentication procedure.

9. The method of claim 1, wherein the source system is a 3rd Generation Partnership Project (3GPP) system and the target system is a non-3GPP system.

10. The method of claim 1, wherein the source system is a non-3rd Generation Partnership Project (3GPP) system and the target system is a 3GPP system.

11. A wireless transmit/receive unit (WTRU) configured to maintain session continuity when switching from a source system to a target system, the WTRU comprising:

a first radio transceiver associated with the source system; and a second radio transceiver associated with the target system, wherein the first radio transceiver is configured to receive, at a physical (PHY) layer, session information for establishing communication between the WTRU and the target system via the second radio transceiver and transfer the session information directly from the PHY layer to at least one of a radio resource control layer or a media access control layer of the second radio transceiver using a crossover connection between the first radio transceiver and the second radio transceiver, and wherein the second radio transceiver is configured to establish the communication between the WTRU and the target system using the session information received from the first radio transceiver.

12. The WTRU of claim 11, wherein the WTRU is configured to use the crossover connection between the first radio transceiver and the second radio transceiver to establish a tunnel with the target system.

13. The WTRU of claim 11, wherein the WTRU is configured to receive a message from the source system instructing the WTRU to initiate an access procedure toward the target system.

14. The WTRU of claim 13, wherein the access procedure is a session initiation protocol (SIP) registration procedure resulting in SIP connectivity with the target system.

15. The WTRU of claim 13, further comprising switching from the source system to the target system after the access procedure is complete.

16. The WTRU of claim 13, wherein the access procedure includes packet data protocol (PDP) context activation.

17. The WTRU of claim 13, wherein the access procedure includes establishing internet protocol (IP) connectivity to the target system.

18. The WTRU of claim 13, wherein the access procedure is at least one of a pre-registration procedure or a pre-authentication procedure.

19. The WTRU of claim 11, wherein the source system is a 3rd Generation Partnership Project (3GPP) system and the target system is a non-3GPP system.

20. The WTRU of claim 11, wherein the source system is a non-3rd Generation Partnership Project (3GPP) system and the target system is a 3GPP system.

* * * * *